(12) United States Patent
Hirose

(10) Patent No.: US 6,181,107 B1
(45) Date of Patent: *Jan. 30, 2001

(54) LI-ION SECONDARY BATTERY PACK, RECHARGER, METHOD AND SYSTEM FOR RECHARGING THE SAME

(75) Inventor: Toshinori Hirose, Saitama (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/191,388

(22) Filed: Nov. 13, 1998

(30) Foreign Application Priority Data

Nov. 14, 1997 (JP) .................................... 9-314124

(51) Int. Cl.$^7$ ........................................ H02J 7/00
(52) U.S. Cl. ................................................ 320/134
(58) Field of Search ................... 320/107, 134, 320/136, 162

(56) References Cited

U.S. PATENT DOCUMENTS

| | | | |
|---|---|---|---|
| 5,640,080 | | 6/1997 | Tamai et al. . |
| 5,648,715 | | 7/1997 | Patino et al. . |
| 5,686,815 | * | 11/1997 | Reipur et al. .................. 320/134 |
| 5,744,936 | * | 4/1998 | Kawakami ...................... 320/120 |
| 5,793,184 | * | 8/1998 | O'Connor ....................... 320/101 |
| 5,923,150 | * | 7/1999 | Umetsu .......................... 320/162 |
| 5,929,593 | * | 7/1999 | Eguchi ........................... 320/139 |
| 5,949,213 | * | 9/1999 | Lanni ............................. 320/106 |
| 6,002,239 | * | 12/1999 | Maloizel ......................... 320/136 |

FOREIGN PATENT DOCUMENTS

| | | |
|---|---|---|
| 9-180764 | 7/1997 | (JP) . |
| 9-259934 | 10/1997 | (JP) . |
| 9-271148 | 10/1997 | (JP) . |

* cited by examiner

Primary Examiner—Peter S. Wong
Assistant Examiner—Pia Tibbits
(74) Attorney, Agent, or Firm—Sughrue, Mion, Zinn, Macpeak & Seas, PLLC

(57) ABSTRACT

In a compact Li-ion (lithium ion) secondary battery pack system, a voltage detecting terminal for detecting a recharged voltage of this battery pack can be is omitted. This Li-ion secondary battery pack system is constituted by employing: an Li-ion secondary battery; a case for storing thereinto the Li-ion secondary battery; recharging terminals exposed from an outer surface of the case; a shortcircuit preventing diode used to connect the recharging terminals to the Li-ion secondary battery, and capable of blocking a flow of a shortcircuit current when a shortcircuit happens to occur between the recharging terminals; a resistance element connected in parallel to the diode; a recharge and an output terminal connected to said Li-ion secondary battery.

3 Claims, 7 Drawing Sheets

LI-ION SECONDARY BATTERY PACK, RECHARGER, METHOD AND SYSTEM FOR RECHARGING THE SAME

BACKGROUND OF THE INVENTION

1. Field of the Invention

The present invention is related to a recharger for recharging a lithium ion (Li-ion) secondary battery pack, a method for recharging the secondary battery pack, and a recharging system.

2. Description of the Related Art

Conventionally, an Li(litium) -ion secondary battery pack is known in the field. FIG. 8 indicates an internal circuit diagram of a typical Li-ion secondary battery pack 900, and a circuit block diagram of a recharger for recharging this type of Li-ion battery pack 900.

As indicated in this drawing, the Li-ion battery pack 900 is arranged by employing a case 901 for storing thereinto an Li-ion secondary battery (cell), an Li-ion secondary battery 902 stored in the case 901, and a plus terminal 903a of a recharging terminal, which is exposed outside the case 901 and is connected via a diode 905 to a plus (positive) polarity side of the Li-ion secondary battery 902. Furthermore, this Li-ion secondary battery pack 900 is arranged by employing a minus terminal 903b of the recharging terminal, which is similarly exposed and is connected to a minus polarity side of the Li-ion secondary battery 902, a resistor element 906 connected to the plus polarity side of the Li-ion secondary battery 902 of the diode, and a voltage detecting terminal 90 connected to this resistor element 906. Also, this Li-ion secondary battery pack is constituted by a plus side 908a of an output terminal which is connected to the plus terminal side of the Li-ion secondary battery 902 and is exposed from the outer surface of the case, and a minus side 908b of the output terminal which is connected to the minus polarity side of the Li-ion battery 902 and is exposed from the outer surface of the case 901.

Also, the recharger 910 for recharging the above-described Li-ion (lithium ion) secondary battery pack 900 is arranged by using a plus terminal 911, a minus terminal 913, a terminal 912, a recharging power supplying unit 920, a voltage measuring unit 930, and a recharging control unit 940. The plus terminal 911 is connected to the plus terminal 903a of the recharging terminal provided with the Li-ion secondary battery pack 900. The minus terminal 913 is connected to the minus side 903b of this recharging terminal. The terminal 912 is connected to the voltage detecting terminal 907. Furthermore, the recharging power supplying unit 920 supplies a predetermined voltage and a predetermined current to the plus terminal 911 and the minus terminal 913, respectively. The voltage measuring unit 930 is connected to the terminal 912 so as to measure the voltage of the Li-ion secondary pack 900. The recharging control unit 940 is connected to both the recharging power supplying unit 920 and the voltage measuring unit 930 in order to control the recharging operation.

In the recharger 910 with the above circuit arrangement for recharging the Li-ion secondary battery pack 900, the recharging control unit 940 starts its recharging operation under a constant current from the recharging terminals 911 and 913. After the output voltage of this Li-ion battery pack recharger 910 measured by the voltage measuring unit 930 reaches the preselected voltage, this recharging control unit 940 continues its recharging operation while keeping this output voltage constant. As a result, the recharging control unit 940 detects the recharging voltage of the Li-ion secondary battery 902 via the voltage detecting terminal 912 by way of the voltage measuring unit 930.

It should be noted that the above-described diode 905 is employed for the shortcircuit preventing element. That is, when the plus terminal 903a of the Li-ion secondary battery pack 900 is shortcircuited with the minus terminal 903b thereof by a metal, and the like, this diode 905 can prevent the flow of this shortcircuit current.

The above-explained conventional Li-ion secondary battery pack, Li-ion battery pack recharger, Li-ion battery pack recharging method, and further Li-ion battery pack recharging system own the following problems.

To recharge the Li-ion secondary battery up to the full recharging voltage, a voltage detecting terminal 907 is required, which greatly impacts the compactness/light weight characteristics of the Li-ion secondary battery pack and the Li-ion secondary battery recharger. On the other hand, in the Li-ion secondary battery pack and the Li-ion secondary battery recharger, the circuit becomes complicated so as to correct the voltage drop occurred in the diode, which may further impede compactness/light weight of these battery pack and battery recharger.

SUMMARY OF THE INVENTION

The present providing a Li-ion secondary battery pack system which can be made compact, light weight, and can be manufactured in a simple construction along with providing a method for recharging the Li-ion secondary battery pack system.

To achieve the above-explained object, an Li-ion (lithium ion) secondary battery pack, is featured by an Li-ion secondary battery; a case for storing thereinto the Li-ion secondary battery; recharging terminals exposed from an outer surface of the case; a shortcircuit preventing diode used to connect the recharging terminals to the Li-ion secondary battery, and capable of blocking a flow of a shortcircuit current when a shortcircuit happens to occur between the recharging terminals; a resistance element connected in parallel to the diode; and an output terminal connected to the Li-ion secondary battery.

An Li-ion secondary battery recharger, is featured by such a recharger for an Li-ion (lithium ion) secondary battery pack including: an Li-ion secondary battery; a case for storing thereinto the Li-ion secondary battery; recharging terminals exposed from an outer surface of the case; a shortcircuit preventing diode used to connect the recharging terminals to the Li-ion secondary battery, and capable of blocking a flow of a shortcircuit current when a shortcircuit happens to occur between the recharging terminals; a resistance element connected in parallel to the diode; and an output terminal connected to the Li-ion secondary battery, the recharger comprising: a recharging power supplying circuit connected to the recharging terminals, for supplying recharging power; a recharging voltage measuring circuit for measuring a voltage appearing at the recharging terminals; and a recharging control circuit for controlling the recharging power supplying circuit based upon the measured voltage by the recharging voltage measuring circuit.

In accordance with the present invention, the recharging control circuit issues an instruction to supply the recharging power to the Li-ion secondary battery from the recharging power supplying circuit, so that this Li-ion secondary battery is recharged. At the same time, the recharging control circuit reads the voltage of the recharging terminals from the recharging voltage measuring circuit, and then controls the recharging power supplying circuit to supply the recharging power to the Li-ion secondary battery in response to this read voltage. As a result, the Li-ion secondary battery can be recharged up to a preselected recharging voltage.

Also, in the Li-ion secondary battery pack recharger, the recharging control circuit controls the recharging power supplying circuit to recharge the Li-ion secondary battery under a constant current until the recharging voltage measuring circuit measures that the voltage appearing at the recharging terminals becomes a preset constant voltage; after recharging the Li-ion secondary battery until the terminal voltage becomes the preset constant voltage, the recharging control circuit controls the recharging power supplying circuit in such a manner that supplying of the constant voltage and interrupting of the supply of the constant voltage are repeatedly performed; while the supply of the constant voltage is interrupted, a voltage measurement by the recharging voltage measuring circuit is carried out; and the recharging control circuit causes the recharging power supplying circuit to continue the recharging operation until the measured voltage is equal to a full recharging voltage.

In accordance with the present invention, the recharging control circuit controls the recharging power supplying circuit to recharge the Li-ion secondary battery in the constant current until the recharging voltage measuring circuit measures a preset constant voltage of this battery. When this preset constant voltage is detected, the recharging control circuit repeatedly performs the supply of the recharging power by the constant voltage and the interrupt of this recharging power supply operation. While this recharging power supply operation is interrupted, the recharging voltage of the Li-ion secondary battery pack is measured by there charging voltage measuring circuit. Then, the recharging operation is carried out until the measured recharging voltage becomes a preselected full recharging voltage.

In accordance with the present invention, the constant voltage is set in such a manner that avoltage defined by subtracting a voltage drop of the diode from the voltage measured at the recharging terminals becomes slightly lower than the full recharging voltage.

More specifically, when the voltage outputted from the Li-ion recharging battery recharger is selected to be approximately 4.4v, and the voltage drop of the diode is approximately 0.4V, the recharging voltage of the Li-ion recharging battery recharger is equal to approximately 4.0V, and also the full recharging voltage is equal to approximately 4.1V.

In accordance with the present invention, the preset constant voltage measured by the recharging voltage measuring circuit is set by the recharging control circuit as follows. That is, this recharging control circuit fine-adjusts the recharging voltage by repeatedly outputting this constant voltage and interrupting the output of this constant voltage in a preselected time period. As a consequence, such a voltage obtained by subtracting the voltage drop of the diode from the voltage at the recharging terminals measured by the recharging voltage measuring circuit becomes slightly lower than the full recharging voltage.

Furthermore, a method for recharging an Li-ion secondary battery, is featured by such a method for recharging an Li-ion (lithium ion) secondary battery pack including: an Li-ion secondary battery; a case for storing thereinto the Li-ion secondary battery; recharging terminals exposed from an outer surface of the case; a shortcircuit preventing diode used to connect the recharging terminals to the Li-ion secondary battery, and capable of blocking a flow of a shortcircuit current when a shortcircuit happens to occur between the recharging terminals; a resistance element connected in parallel to the diode; and an output terminal connected to the Li-ion secondary battery, wherein: recharging power is supplied to the recharging terminals, and also a voltage appearing at the recharging terminals is measured so as to control the supply of the recharging power.

Moreover, according to the present invention, the above explained Li-ion secondary battery pack and Li-ion battery pack recharger may be combined with each other. That is, a recharging system arranged in combination with the Li-ion battery pack and the battery pack recharger, is featured in that the Li-ion (lithium ion) secondary battery pack is comprised of: an Li-ion secondary battery; a case for storing thereinto the Li-ion secondary battery; recharging terminals exposed from an outer surface of the case; a shortcircuit preventing diode used to connect the recharging terminals to the Li-ion secondary battery, and capable of blocking a flow of a shortcircuit current when a shortcircuit happens to occur between the recharging terminals; a resistance element connected in parallel to the diode; and an output terminal connected to the Li-ion secondary battery, and also wherein: the Li-ion secondary battery pack recharger is comprised of: a recharging power supplying circuit connected to the recharging terminals, for supplying recharging power; a recharging voltage measuring circuit for measuring a voltage appearing at the recharging terminals; and a recharging control circuit for controlling the recharging power supplying circuit based upon the measured voltage by the recharging voltage measuring circuit.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENT

Referring now to drawings, various preferred embodiments of the present invention will be described in detail.

STRUCTURE OF Li-ION SECONDARY BATTERY PACK

A first description will now be made of an Li-ion (lithium ion) secondary battery pack, according to an embodiment of the present invention, which is used with a portable telephone.

Figure 1:
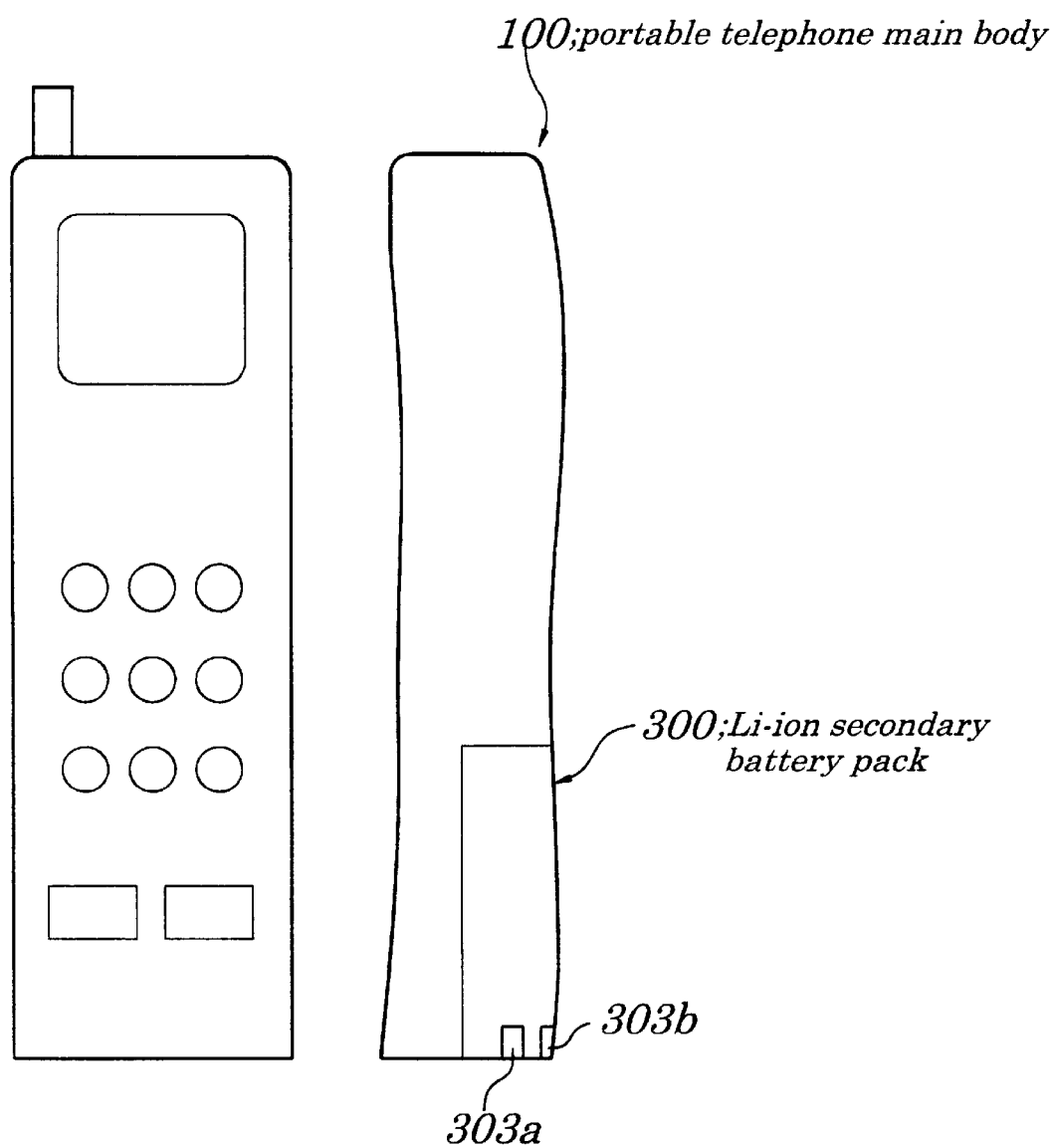
FIG. 1 illustratively shows a portable telephone combined with an Li-ion secondary battery pack according to an embodiment of the present invention.

FIG. 1 illustratively shows aportable telephone combined with the above-described Li-ion secondary battery pack 300 of this embodiment.

In this drawing, the Li-ion secondary battery pack 300 is combined with a main body 100 of the portable telephone under such a condition that recharging terminals 303a and 303b of this Li-ion battery pack 300 are directed to an outer side thereof.

Figure 2:
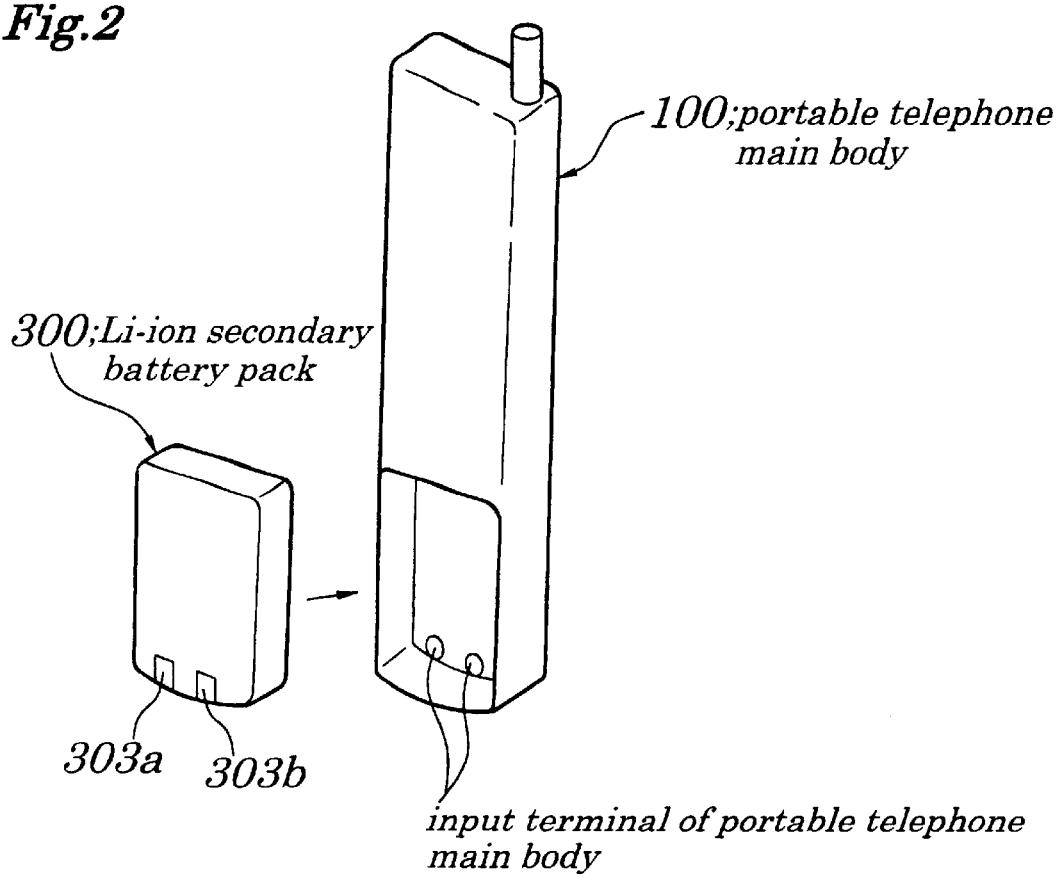
FIG. 2 perspectively indicates the portable telephone, and the Li-ion secondary battery pack of the embodiment separated from this portable telephone.
Figure 3:
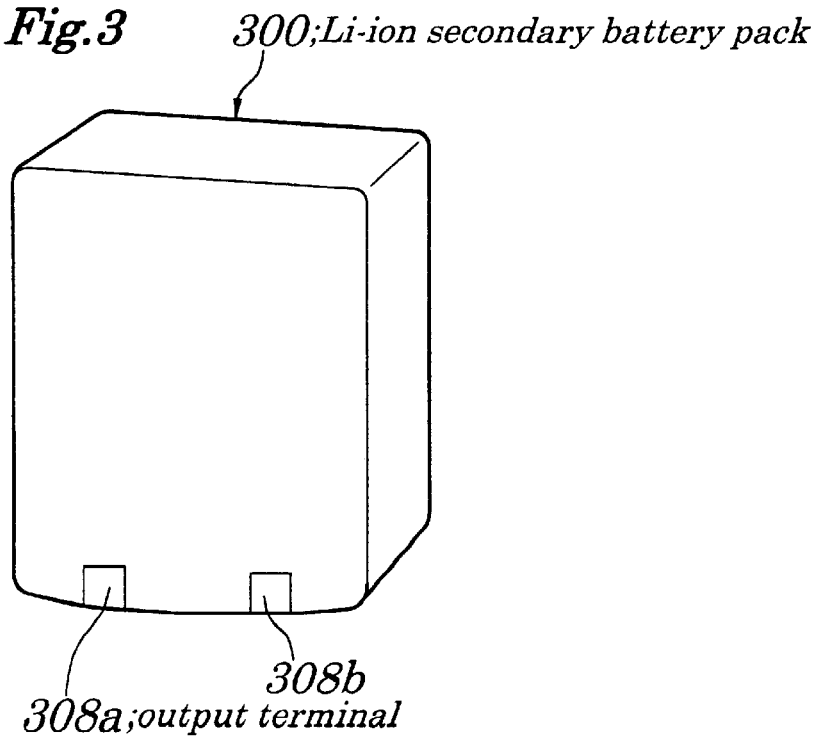
FIG. 3 illustratively represents a reside of the Li-ion secondary battery pack showing the output terminals according to the embodiment.

FIG. 2 illustratively indicates such a condition that the above-explained Li-ion secondary battery pack 300 is separated, or detached from the portable telephone main body 100. As illustrated in this drawing, this Li-ion secondary battery pack 300 may be combined with the portable telephone main body 100 in such a manner that while an output terminal thereof (not shown) is directed to a joint unit of this portable telephone main body 100, this Li-ion secondary battery pack 300 is pushed along a direction indicated by an arrow. Then, FIG. 3 represents a rear side of this Li-ion secondary battery pack 300 where this rear side is jointed to the portable telephone main body 100.

As seen from the drawing, an output terminal 308a and another output terminal 308b of the above-explained Li-ion secondary battery pack 300 are located at a lower portion of this battery pack 300, which is positioned opposite to the recharging terminals 303a and 303b of this Li-ion secondary battery pack 300. These output terminals 308a and 308b of this Li-ion secondary battery pack 300 are jointed to input terminals (not shown) of the portable telephone main body 100, so that the Li-ion secondary battery pack 300 is operable as a power supply of this portable telephone.

ARRANGEMENT OF Li-ION SECONDARY BATTERY PACK RECHARGING SYSTEM

Figure 4:
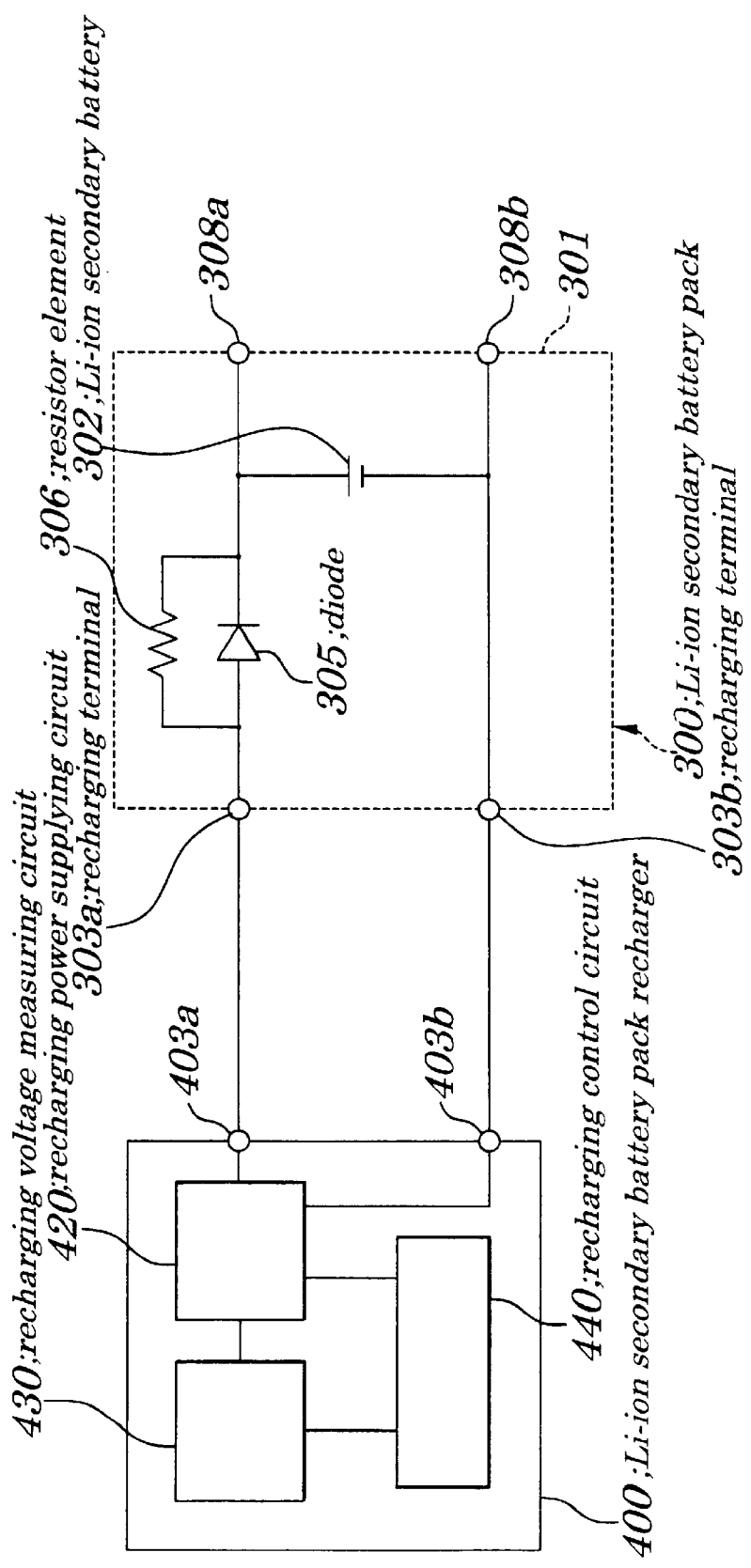
FIG. 4 is a circuit block diagram for indicating an arrangement of a recharging system for recharging the Li-ion secondary battery pack, according to an embodiment of the present invention.

Referring now to a circuit block diagram of FIG. 4, an arrangement of an Li-ion secondary battery pack recharging system according to an embodiment of the present invention will be described which is employed so as to recharge the above-explained Li-ion secondary battery pack 300.

As indicated in this drawing, the Li-ion battery pack 300 is arranged by employing a case 301 for storing thereinto an Li-ion secondary battery (cell), an Li-ion secondary battery 302 stored in the case 301, and a plus terminal 303a of a recharging terminal, which is exposed outside the case 301 and is connected via a diode 305 to a plus (positive) polarity side of the Li-ion secondary battery 302. Furthermore, this Li-ion secondary battery pack 300 is arranged by employing a minus terminal 303b of the recharging terminal, which is similarly exposed outside the case 301 and is connected to a minus polarity side of the Li-ion secondary battery 302, a diode 305 connected between the above-described recharging terminal 303a and a plus polarity side of the Li-ion secondary battery 302, and a resistor element 306 connected in parallel to the diode 305. Also, this Li-ion secondary battery pack 300 is constituted by a plus side 308a of an output terminal which is connected to the plus terminal side of the Li-ion secondary battery 302 and is exposed from the outer surface of the case 301, and also a minus side 308b of the output terminal which is similarly exposed outside the case 301 and is connected to a minus polarity of the Li-ion secondary battery 302.

Also, the recharger 400 for recharging the above-described Li-ion (lithium ion) secondary battery pack 300 is arranged by using a plus terminal 403a, a minus terminal 403b, a recharging power supplying unit 420, a recharging voltage measuring unit 430, and a recharging control unit 440. The plus terminal is connected to the plus terminal 403a of the recharging terminal provided with the Li-ion secondary battery pack 300. The minus terminal is connected to the minus side 403b of this recharging terminal. The recharging power supplying circuit 420 supplies recharging power to the Li-ion secondary battery pack 300, and is connected to the plus/minus terminals 403a and 403b. The recharging voltage measuring circuit 430 is connected to the recharging power supply circuit 420 so as to measure a voltage appearing at the recharging terminal, and also a voltage appearing at the recharging power supplying circuit 420. Furthermore, the recharging control circuit 440 is connected to both the charging power supplying circuit 420 and the charging power measuring circuit 430 in order to control the output of the recharging power and also to read out the measured voltage.

RECHARGING CONTROLS BY RECHARGING CONTROL CIRCUIT

Figure 5:
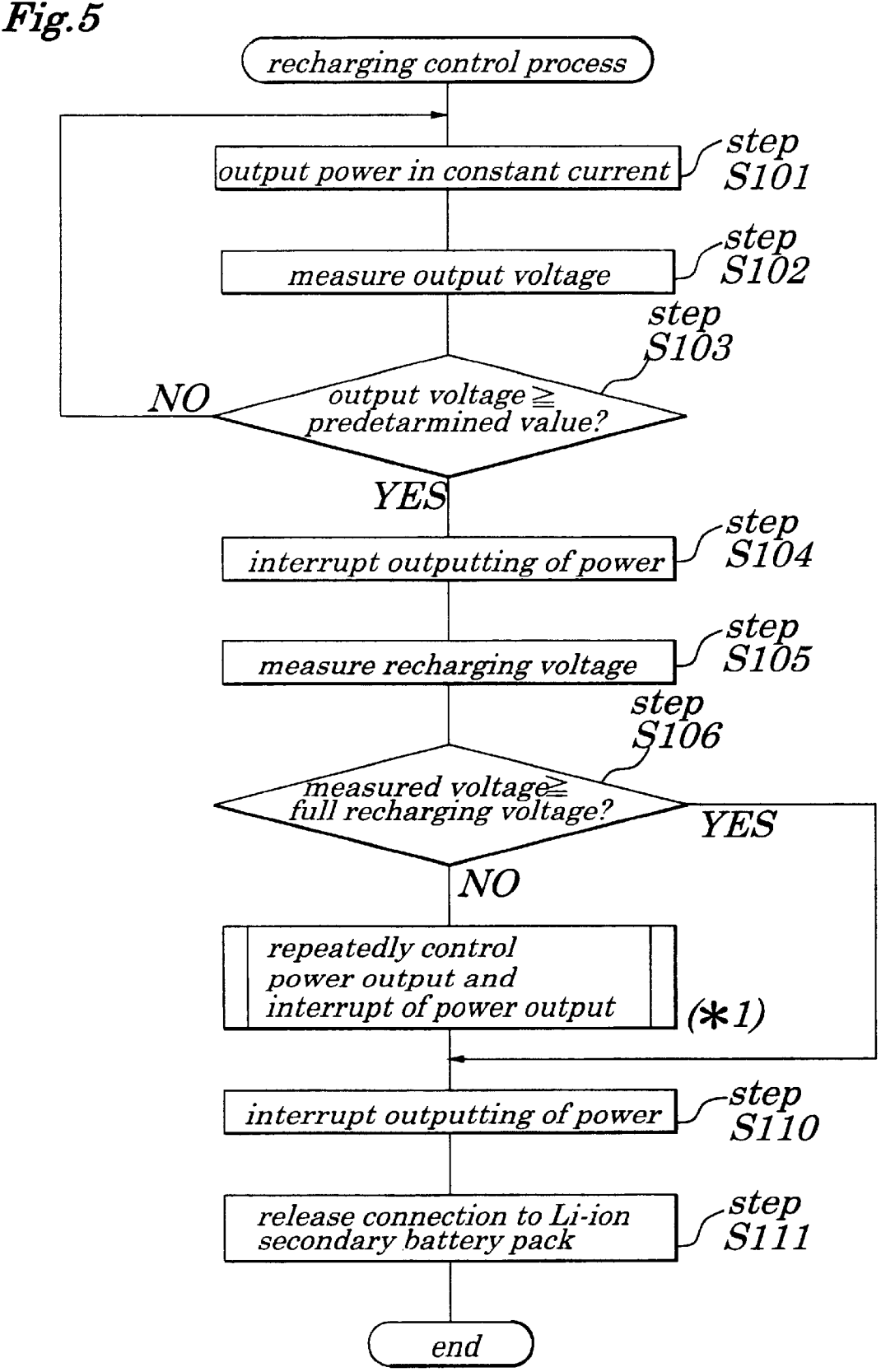
FIG. 5 is a flow chart for describing a recharging control operation executed by the Li-ion battery pack recharging system of FIG. 4.
Figure 6:
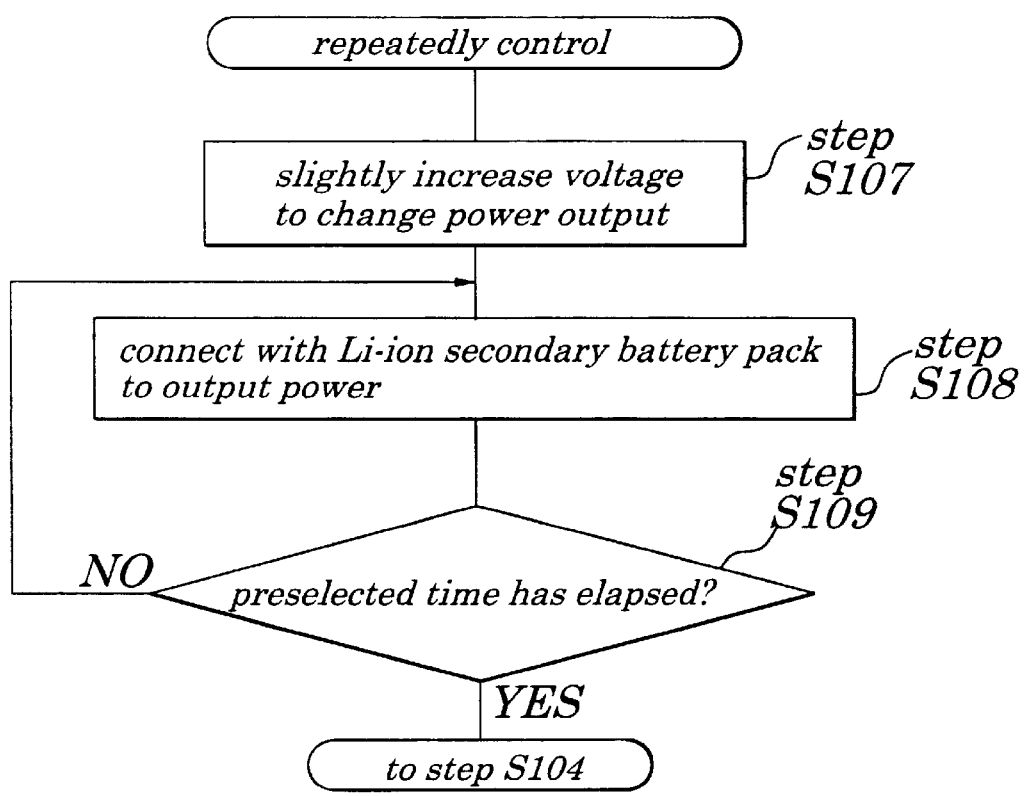
FIG. 6 is a flow chart for explaining another recharging control operation performed by the Li-ion battery pack recharging system of FIG. 4.

Referring now to flow charts shown in FIG. 5 and FIG. 6, contents of recharging control operation executed by the recharging control circuit 440 will be discussed.

This recharging control operation is mainly classified into two process operations. A first process operation is defined until the output voltage of the recharging power supplying circuit 420 becomes a constant voltage. A second process operation is defined until the voltage of the Li-ion secondary battery pack 300 becomes the full recharging voltage.

In this embodiment, process operations defined from a step S101 to a step S103 in the first process operation are repeatedly performed until the output voltage of the recharging power supply circuit 420 reaches the constant voltage. First, the recharging control circuit 440 commences the recharging operation under a constant current in the recharging power supplying circuit 420 (step S101).

Next, the recharging voltage measuring circuit 430 measures the voltage of the recharging power supplying circuit 420 (step S102). Then, this recharging control circuit 440 judges as to whether or not the measured voltage is higher than, or equal to the constant voltage (step S103). When the measured voltage does not reach the constant voltage, this process operation is returned to the previous step S101.

Also, in the second process operation, when the voltage of the recharging power supplying circuit 420 becomes higher than, or equal to the constant voltage, the supply of the recharging power is stopped (step S104), and the recharging control circuit 440 causes the recharging voltage measuring circuit 430 to measure the recharging voltage of this Li-ion secondary battery pack 300 (step S105). The recharging control circuit 440 judges as to whether or not this measured voltage is equal to the full recharging voltage (step S106). When the measured voltage is not equal to the full recharging voltage, the recharging control circuit 440 controls the recharging power supplying circuit 420 in such a manner that the output voltage of this recharging power supplying circuit 420 becomes slightly higher than the above-explained constant voltage (step S107). Then, this slightly higher voltage is applied from the recharging power supplying circuit 420 to the Li-ion secondary battery pack 300 (step S108). Since the recharging control circuit 440 repeatedly outputs the voltage and stops the voltage output, a time duration is measured when the voltage output is commenced. Until preselected time has elapsed, the power is outputted from the recharging power supply circuit 420. After the preselected time has passed, the process operation is returned to the above step S104 (step S109). Then, the control operations defined from the step S104 to the step S109 are repeatedly performed.

On the other hand, when the measured voltage becomes equal to the full recharging voltage, the recharging control circuit 440 stops the supply of the recharging power from the recharging power supplying circuit 420 (step S110), and also disconnects the connection between this recharging power supplying circuit 420 and the Li-ion secondary battery pack 300 (step S111).

Referring now to the flow charts shown in FIG. 5 and FIG. 6, operations of this embodiment with the above-explained circuit arrangement will be described.

The Li-ion secondary battery pack 300 is electrically connected to the Li-ion battery pack recharger 400. As a result, this Li-ion battery pack recharger 400 supplies the recharging power in a constant current to the Li-ion secondary battery pack 300, so that the recharging operation is commenced. The supply of this recharging power is continued until the recharging voltage becomes aconstant voltage (steps S101 to S103) . The Li-ionbattery pack recharger 400 measures the output voltage, and stops the power supply when this measured voltage becomes higher than, or equal to the constant voltage (step S104).

In accordance with this embodiment, a "constant voltage" is defined as follows, considering now to such a fact that the voltage drop occurred across the diode 305 is equal to approximately 0.4V. That is, this constant voltage is selected to be 4.4V when the voltage output from the Li-ion secondary battery pack recharger 400 becomes 4.4V. In other words, when the voltage outputted from the Li-ion battery pack recharger 400 becomes 4.4V, the recharging voltage of the Li-ion secondary battery 302 becomes 4.0V from the voltage drop in the diode 305.

Next, the recharging voltage of the Li-ion secondary battery 302 is measured (step S105) so as to judge as to whether or not this measured recharging voltage is equal to the full recharge voltage (step S106). In this embodiment, when the voltage of the Li-ion secondary battery 302 becomes 4.1V, this voltage is equal to the full recharging voltage.

If the measured recharging voltage is not equal to this full recharging voltage, then the voltage output value is controlled to vary the power output (step S107). Then, since the recharging power supplying circuit 420 is connected to the Li-ion secondary battery pack 300, the supply of the recharging power to this Li-ion secondary battery pack 300 is commenced (step S108). This supply of the recharging power is carried out for a predetermined time period. After a predetermined time period has passed (step S109), the connection of the recharging power supplying circuit 420 is released (step S104). As described above, the supply of the recharging power and the interrupt of the power supply are repeatedly controlled.

In the case that it is so judged at the step S106 that the measured recharging voltage becomes equal to the full recharging voltage under this repetition control, the connection of the recharging power supplying circuit 420 is released so as to stop the voltage out (step S110) . Then, the Li-ion battery pack recharger 400 is released from the Li-ion secondary battery pack 300 (step S111), so that the recharging operation can be accomplished.

Figure 7:
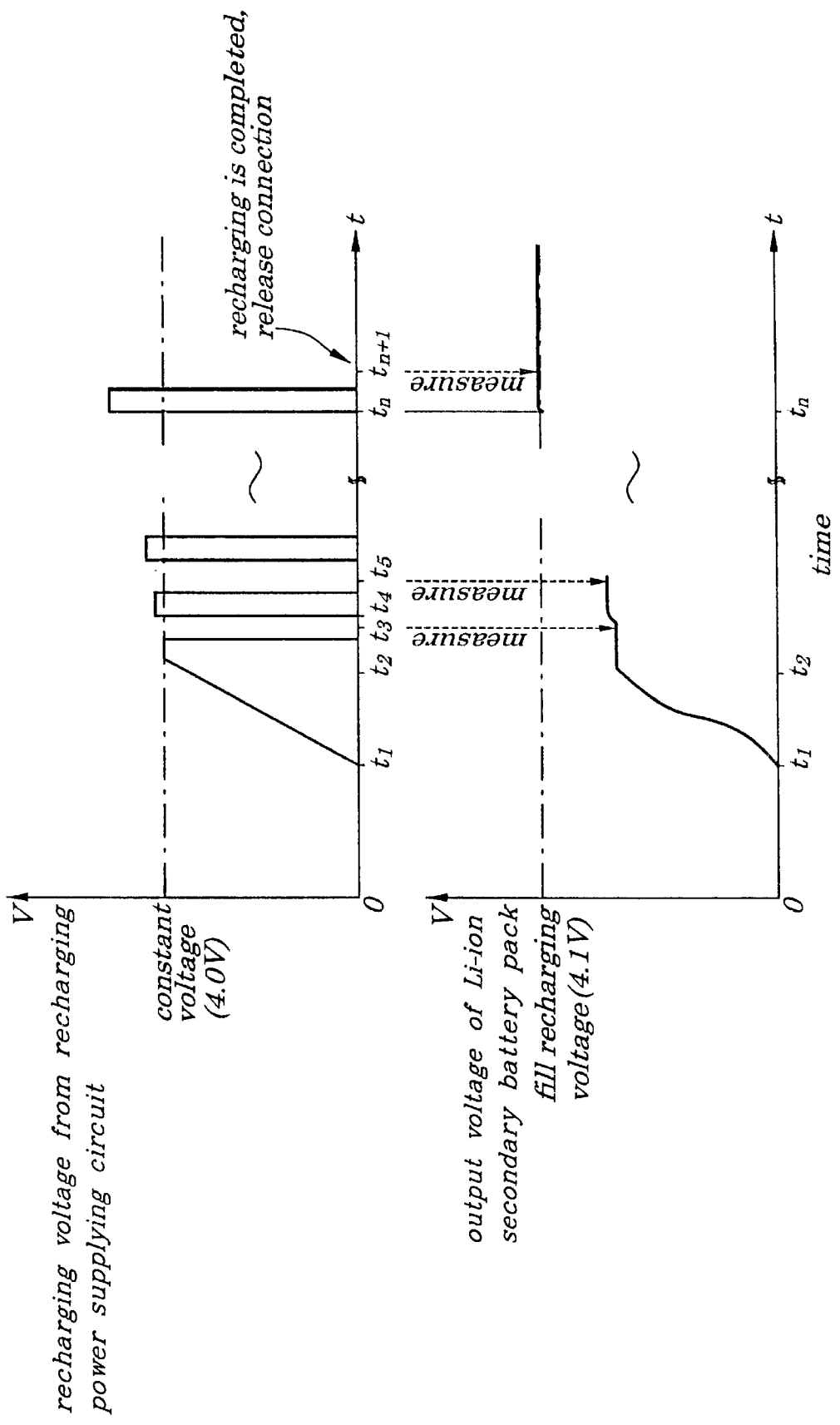
FIG. 7 is a time chart for representing the recharging operation by the Li-ion battery pack recharging system of FIG. 4.
Figure 8:
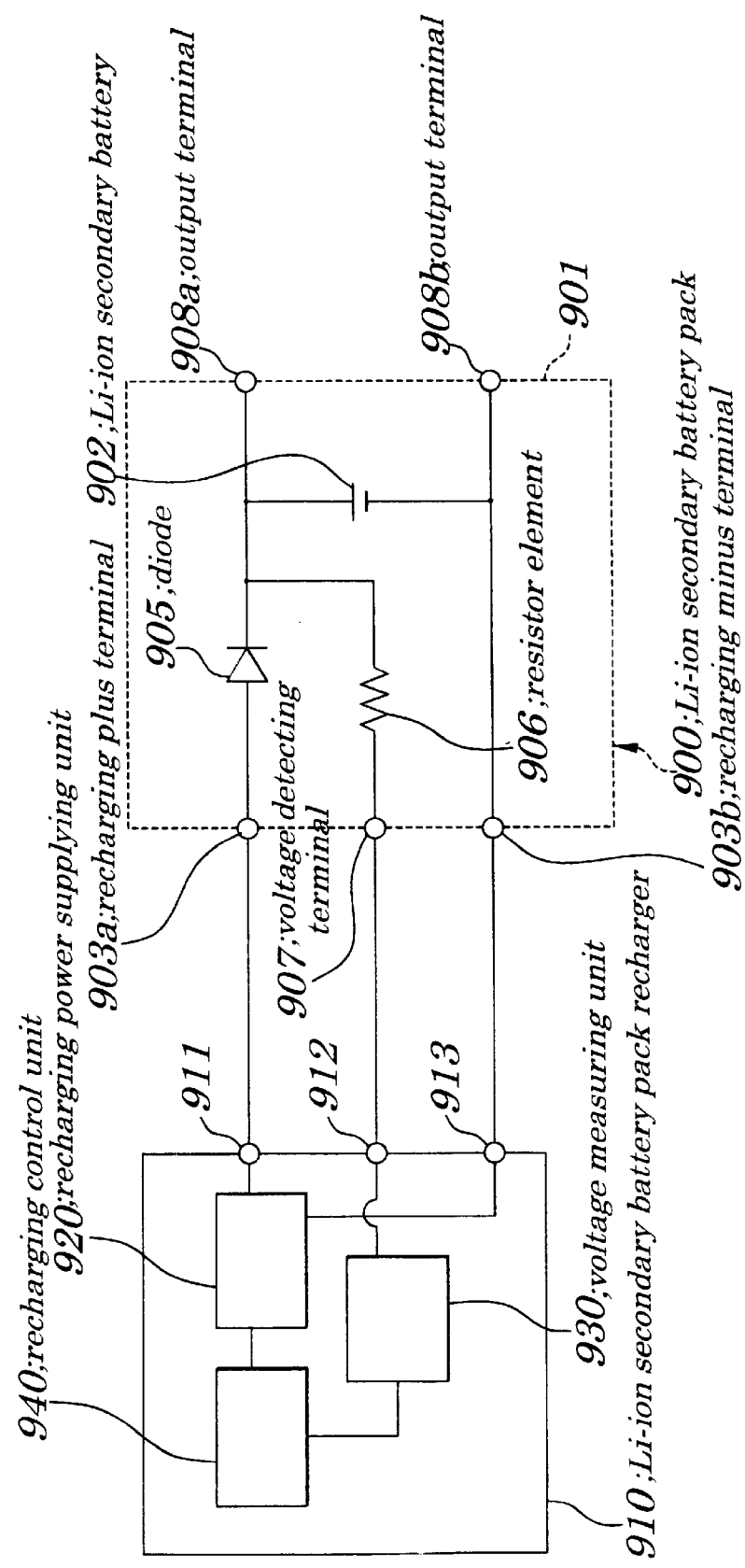
FIG. 8 is a circuit block diagram for showing the arrangement of the conventional Li-ion battery pack recharging system.

FIG. 7 is a timing chart for representing a voltage variation of the recharging power supplying circuit 420, and also a voltage variation of the Li-ion secondary battery pack 300, according to this embodiment. That is, an ordinate of this timing chart indicates a voltage, and an abscisse thereof shows time.

A time instant "t1" shown in this timing chart indicates a start of the recharging operation. At a time instant "t2", since the voltage outputted from the recharging power supplying circuit 420 reaches the constant voltage of 4.0V, the supply of the recharging power is stopped. Next, at a time instant "t3", an output voltage voltage of the Li-ion secondary battery pack 300 is measured. Since this measured output voltage is not equal to the full recharging voltage at this time instant "t3", the supply of the recharging power from the recharging power supplying circuit 420 is commenced at a time instant "t4".

Subsequently, this recharging power supplying circuit 420 repeatedly performs, supplying of the recharging power and interrupting of the supply of the recharging power. At a further time instant "tn", the output voltage of the Li-ion secondary battery pack 300 reaches the full recharging voltage of 4.1V. Thereafter, at a time instant "t(n+1)", the recharging voltage of the Li-ion secondary battery pack 300 is measured. At this stage, since this measured output voltage already reaches the full recharging voltage of 4.1V, the connection between the Li-ion battery pack recharger 400 and the Li-ion secondary battery pack 300 is released, so that a series of the recharging operation is accomplished.

As previously described, since the resistance element is connected in parallel to the shortcircuit preventing diode capable of blocking the shortcircuit current, it is possible to provide the Li-ion secondary battery pack having such a simple structure constituted by the recharging terminal and the output terminal.

Also, it is possible to provide the Li-ion secondary battery pack recharger capable of recharging the Li-ion secondary battery pack system.

Furthermore, the Li-ion secondary battery can be recharged up to the full recharging voltage even by employing the simple circuit arrangement.

In addition, the total recharging time can be shortened by setting the constant voltage.

Also, it is possible to provide the method for recharging the Li-ion secondary battery, while the recharging operation can be carried out within short time and the simple arrangement is maintained.

Moreover, in accordance with the present invention it is possible to provide the recharging system combined with the Li-ion secondary battery pack and the Li-ion battery pack recharger.

It is thus apparent that the present invention is not limited to the above embodiments but may be changed and modified without departing from the scope and spirit of the invention.

Finally, the present application claims the priority of Japanese Patent Application No. Hei9-314124 filed on Nov. 14, 1997, which is herein incorporated by reference.

What is claimed is:

1. A recharger (400) for recharging an Li-ion (lithium ion) secondary battery pack comprising:
   (a) a recharging power supplying circuit (420) connected to recharging terminals of a battery case, for supplying recharging power;
   (b) a recharging voltage measuring circuit (430);
   (c) a recharging control circuit (440) for controlling said recharging power supplying circuit (420) based upon a measured voltage measured by said recharging voltage measuring circuit (430); wherein:

a recharging operation is classified into a first process operation (from S101 to S103) and a second process operation (from S104 to S109); said first process operation (from S101 to S103) is performed until an output voltage of said recharging power supplying circuit (420) becomes a constant voltage; and, said second process operation (from S104 to S109) is performed until a voltage of said Li-ion secondary battery pack becomes its full recharging voltage; wherein said first process operation comprises a first step (S101), second step (S102) and a third step (S103); and in said first step (S101), said recharging control circuit (440) commences said charging operation at a constant current issued from said recharging power supplying circuit (420);

in said second step (S102), said recharging voltage measuring circuit (430) measures said output voltage of said recharging power supplying circuit (420);

in said third step (S103), said recharging control circuit (440) judges as to whether or not the thus measured output voltage of said recharging power supplying circuit (420) is higher than, or equal to said constant voltage; said third step (S103) is followed by said first step (S101) when the thus measured output voltage of said recharging power supplying circuit (420) does not reach said constant voltage; said third step (S103) is followed by a fourth step (S104) of said second process operation (from S104 to S109) when the thus measured output voltage of said recharging power supplying circuit (420) is higher than, or equal to said constant voltage, so that said first process operation (from S101 to S103) is completed and followed by said second process operation (from S104 to S109); the improvement wherein:

said fourth step (104) of said second process operation (from S104 to S109), rechargaing, is temporarily stopped, said fourth step (104) being followed by a fifth step (S105);

in said fifth step (S105), said recharging control circuit (440) causes said recharging voltage measuring circuit (430) to measure a recharging voltage of said secondary battery pack, said fifth step (S105) bein followed by a sixth step (S106);

in said sixth step (S106), said recharging control circuit (440) judges as to whether or not the thus measured voltage of said secondary battery pack is equal to said full recharging voltage, raid sixth step (S106) being followed by a seventh step (S107);

in said seventh step (S107), said recharging control circuit (440) controls said recharging power supplying circuit (420) in such a manner that said output voltage of said recharging power supplying circuit (420) becomes slightly higher than said constant voltage to form a first slightly higher output voltage, said seventh step (S107) being followed by an eight step (S108);

in said eighth step (S108), said first slightly higher output voltage is applied from said recharging power supplying circuit (420) to said Li-ion secondary battery, said eighth step (S108) being followed by a ninth step (S109);

in said ninth step (S109), said first slightly higher output voltage is applied for a predetermined time; and in said ninth step (S109) of said second process operation (from S104 to S109) is followed by said fourth step (S104) of said second process operation (from S104 to S109) to complete a first cycle of said second process operation, said first cycle being followed by a second cycle of said second process operation (from S104 to S109), said second cycle being followed by a subsequent cycle, said subsequent cycle being followed by a further subsequent cycle, and so on until the recharging voltage of said Li-ion secondary battery reaches its full recharging voltage;

wherein said slightly higher output voltages intermittently applied to said Li-ion secondary battery are gradually increased in magnitude to effectively shorten a recharging period of time for said Li-ion secondary battery.

2. A recharging system comprising:

(a) a Li-ion secondary battery pack, said battery pack comprising:

(1) an Li-ion secondary battery;

(2) a case for storing therein said secondary battery;

(3) recharging terminals exposed from an outer surface of said case;

(4) a shortcircuit preventing diode used to connect said recharging terminals to said Li-ion secondary battery, and capable of blocking a flow of a short-circuit current when a shortcircuit happens to occur between said recharging terminals; and (5) a resistance clement connected in parallel to said diode; and (b) a recharger according to claim 1.

3. A method for recharging an Li-ion (lithium ion) secondary battery pack comprising:

(a) performing a first process operation (from S101 to S103); and (b) performing a second process operation (from S104 to S109); wherein:

said first process operation (from S101 to S104) is performed until an output voltage of a recharging power supplying circuit (420) becomes a constant voltage; and said second process operation (from S104 to S109) is performed until a voltage of said Li-ion secondary battery pack becomes its full recharging voltage; wherein said first process operation comprises a first step (S101), second step (S102) and a third step (S103);

in said first step (S101), a recharging control circuit (440) commences a charging operation at a constant current issued from said recharging power supplying circuit (420);

in said second step (S102), a recharging voltage measuring circuit (430) measures said output voltage of said recharging power supplying circuit (420);

in said third step (S103), said recharging control circuit (440) judges as to whether or not the thus measured output voltage of said recharging power supplying circuit (420) is higher than, or equal to said constant voltage; said third step (S103) is followed by said first step (S101) when the thus measured output voltage of said recharging power supplying circuit (420) does not reach said constant voltage; said third step (S103) is followed by a fourth step (S104) of said second process operation (from S104 to S109) when the thus measured output voltage of said recharging power supplying circuit (420) is higher than, or equal to said constant voltage, so that said first process operation (from S101 to S103) is completed and followed by said second process operation (from S104 to S109); the improvement wherein:

in said fourth step (104) of said second process operation (from S104 to S109), recharging is temporarily stopped, said fourth step (104) being followed by a fifth step (S105);

in said fifth step (S105), said recharging control circuit (440) causes said recharging voltage measuring circuit (430) to measure a recharging voltage of said secondary battery pack, said fifth step (S105) being followed by a sixth step (S106);

in said sixth step (S106), said recharging control circuit (440) judges as to whether or not the thus measured voltage of said secondary battery pack is equal to said full recharging voltage, said sixth step (S106) being followed by a seventh step (S107);

in said seventh step (S107), said recharging control circuit (440) controls said recharging power supplying circuit (420) in such a manner that said output voltage of said recharging power supplying circuit (420) becomes slightly higher than said constant voltage to form a first slightly higher output voltage, said seventh step (S107) being followed by an eighth step (S108);

in said eighth step (S108), said first slightly higher output voltage is applied from said recharging power supplying circuit (420) to said Li-ion secondary battery, said eighth step (S108) being followed by a ninth step (S109);

in said ninth step (S109), said first slightly higher output voltage is applied for a predetermined time; and said ninth step (S109) of said second process operation (from S104 to S109) is followed by said fourth step (S104) of said second process operation (from S104 to S109) to complete a first cycle of said second process operation, said first cycle being followed by a second cycle of said second process operation (from S104 to S109), said second cycle being followed by a subsequent cycle, said subsequent cycle being followed by a further subsequent cycle, and so on until the recharging voltage of said Li-ion secondary battery reaches its full recharging voltage;

wherein said slightly higher output voltages intermittently applied to said Li-ion secondary battery are gradually increased in magnitude to effectively shorten a recharging period of time for said Li-ion secondary battery.

* * * * *